United States Patent
Zinnecker et al.

(10) Patent No.: US 10,451,035 B2
(45) Date of Patent: Oct. 22, 2019

(54) SYSTEM AND METHOD FOR REDUCING WIND TURBINE ROTOR BLADE LOADS

(71) Applicant: General Electric Company, Schenectady, NY (US)

(72) Inventors: Alicia Mae Zinnecker, Greenville, SC (US); Ryan Michael Sunyak, Greenville, SC (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 15/586,506

(22) Filed: May 4, 2017

(65) Prior Publication Data

US 2018/0320659 A1 Nov. 8, 2018

(51) Int. Cl.
  *F03D 7/02* (2006.01)
  *F03D 7/04* (2006.01)
  *F03D 17/00* (2016.01)

(52) U.S. Cl.
  CPC ............ *F03D 7/0224* (2013.01); *F03D 7/024* (2013.01); *F03D 7/042* (2013.01); *F03D 17/00* (2016.05); *F05B 2270/1095* (2013.01); *F05B 2270/326* (2013.01); *F05B 2270/327* (2013.01); *F05B 2270/328* (2013.01); *F05B 2270/331* (2013.01)

(58) Field of Classification Search
  CPC ........ F03D 7/0224; F03D 7/042; F03D 7/043; F03D 7/044; F03D 7/045; F03D 7/046
  See application file for complete search history.

(56) References Cited

U.S. PATENT DOCUMENTS

| | | | |
|---|---|---|---|
| 7,950,901 B2 | 5/2011 | Barbu et al. | |
| 8,096,762 B2* | 1/2012 | Risager | F03D 7/0224 416/1 |
| 8,622,698 B2* | 1/2014 | Kristoffersen | F03D 7/0224 290/44 |
| 8,847,419 B2 | 9/2014 | Bertolotti et al. | |
| 9,217,416 B2 | 12/2015 | Spruce et al. | |
| 9,777,708 B2* | 10/2017 | Risager | F03D 7/0224 |
| 2010/0092292 A1* | 4/2010 | Nies | F03D 7/0224 416/41 |
| 2014/0140844 A1 | 5/2014 | Slot | |
| 2014/0154075 A1* | 6/2014 | Kristoffersen | F03D 7/0224 416/1 |
| 2014/0178197 A1* | 6/2014 | Risager | F03D 7/0224 416/1 |
| 2014/0271183 A1* | 9/2014 | Barber | F03D 7/0224 416/1 |
| 2015/0078895 A1 | 3/2015 | Odgaard | |

(Continued)

FOREIGN PATENT DOCUMENTS

WO   WO2012/163362 A2   12/2012

*Primary Examiner* — Carlos A Rivera
*Assistant Examiner* — Behnoush Haghighian
(74) *Attorney, Agent, or Firm* — Dority & Manning, P.A.

(57) ABSTRACT

The present disclosure is directed to a method for reducing loads of one or more rotor blades of a wind turbine. The method includes monitoring a load of a first rotor blade. If the load of the first rotor blade exceeds a first load threshold, the method also includes designating a rotor plane sector in which the first rotor blade is located as a high load rotor plane sector. The method further includes adjusting, via a pitch drive mechanism, a pitch angle of a second rotor blade toward a first position before the second rotor blade enters the high load rotor plane sector.

17 Claims, 7 Drawing Sheets

(56) References Cited

U.S. PATENT DOCUMENTS

| | | |
|---|---|---|
| 2015/0267686 A1 | 9/2015 | Kjaer et al. |
| 2016/0131111 A1 | 5/2016 | Olesen |
| 2016/0186722 A1 | 6/2016 | Olesen |
| 2017/0218923 A1* | 8/2017 | Baba .................... F03D 7/0224 |
| 2017/0321654 A1* | 11/2017 | Zheng .................... F03D 7/043 |

* cited by examiner

SYSTEM AND METHOD FOR REDUCING WIND TURBINE ROTOR BLADE LOADS

FIELD

The present disclosure generally relates to wind turbines. More particularly, the present disclosure relates to systems and methods for reducing loads of wind turbine rotor blades.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a generator positioned in the nacelle, and one or more rotor blades coupled to a hub. The one or more rotor blades convert kinetic energy of wind into mechanical energy using known airfoil principles. A drivetrain transmits the mechanical energy from the hub to the generator. The generator then converts the mechanical energy to electrical energy that may be supplied to a utility grid.

The orientation of the rotor blades may be adjustable to control the amount of kinetic energy extracted from the wind. More specifically, the rotor blades may be rotatably coupled to the hub. In this respect, a pitch drive mechanism may rotate each rotor blade about a corresponding pitch axis to adjust a pitch angle of thereof. As such, the pitch angles of the rotor blades may be adjusted between a feathered position where a minimum amount kinetic energy extracted from the wind and a power position where a maximum amount kinetic energy extracted from the wind.

The pitch drive mechanisms may adjust the pitch angles of the rotor blades to control the loads exerted on the rotor blades by the wind and other atmospheric conditions. For example, when the rotor blades experience high wind velocities, the pitch angles of the rotor blades may be adjusted toward the feathered position to reduce the loads thereof. When the wind velocities decrease, the pitch angles of the rotor blades may be adjusted back toward the power position.

The wind velocities experienced by the rotor blades may vary depending on the rotational position of the rotor blades relative to the nacelle. As such, the loads of the rotor blades may also vary with rotational position. In this respect, the pitch drive mechanisms may adjust the pitch angles of the rotor blades toward the feathered position to reduce the loads thereof when the rotor blades are positioned in rotational positions where high wind velocities are present. The pitch drive mechanisms may then adjust the rotor blades toward the power position when the rotor blades leave the rotational positions where high wind velocities are present. In certain instances, the pitch drive mechanisms may not be capable of adjusting the pitch angles of the rotor blades quickly enough to compensate for the changes in wind velocity. As such, the pitch drive mechanisms may become saturated and may experience significant wear.

Accordingly, improved wind turbines, and, in particular, improved systems and methods for reducing loads of wind turbine rotor blades, are desired in the art. Specifically, systems and methods that do not saturate the pitch drive mechanisms and produce relatively less wear on the wind turbine would be advantageous.

BRIEF DESCRIPTION

Aspects and advantages of the technology will be set forth in part in the following description, or may be obvious from the description, or may be learned through practice of the technology.

In one embodiment, the present disclosure is directed to a method for reducing loads of one or more rotor blades of a wind turbine. The method includes monitoring a load of a first rotor blade. If the load of the first rotor blade exceeds a first load threshold, the method also includes designating a rotor plane sector in which the first rotor blade is located as a high load rotor plane sector. The method further includes adjusting, via a pitch drive mechanism, a pitch angle of a second rotor blade toward a first position before the second rotor blade enters the high load rotor plane sector.

In another embodiment, the present disclosure is directed to a system for reducing loads of one or more rotor blades of a wind turbine. The system includes a pitch drive mechanism for adjusting a pitch angle of one or more of the rotor blades. The system also includes a controller communicatively coupled to the pitch drive mechanism. The controller is configured to perform one or more operations. The one or more operations include monitoring a load of a first rotor blade. If the load of the first rotor blade exceeds a first load threshold, the one or more operations also include designating the rotor plane sector in which the first rotor blade is located as a high load rotor plane sector. The one or more operation further include controlling the pitch drive mechanism to adjust the pitch angle of the second rotor blade toward a first position before the second rotor blade enters the high load rotor plane sector.

In a further embodiment, the present disclosure is directed to a wind turbine. The wind turbine includes a tower, a nacelle mounted atop the tower, and a rotor rotatably coupled to the nacelle. The rotor includes at least a first rotor blade and a second rotor blade. The first and second rotor blades define a rotor plane including a plurality of rotor plane sectors. The wind turbine also includes a pitch drive mechanism for adjusting a pitch angle of the first and second rotor blades. The wind turbine further includes a controller communicatively coupled to the pitch drive mechanism. The controller is configured to perform one or more operations. The one or more operations include monitoring a load of a first rotor blade. If the load of the first rotor blade exceeds a first load threshold, the one or more operations also include designating the rotor plane sector in which the first rotor blade is located as a high load rotor plane sector. The one or more operation further include controlling the pitch drive mechanism to adjust the pitch angle of the second rotor blade toward a first position before the second rotor blade enters the high load rotor plane sector.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
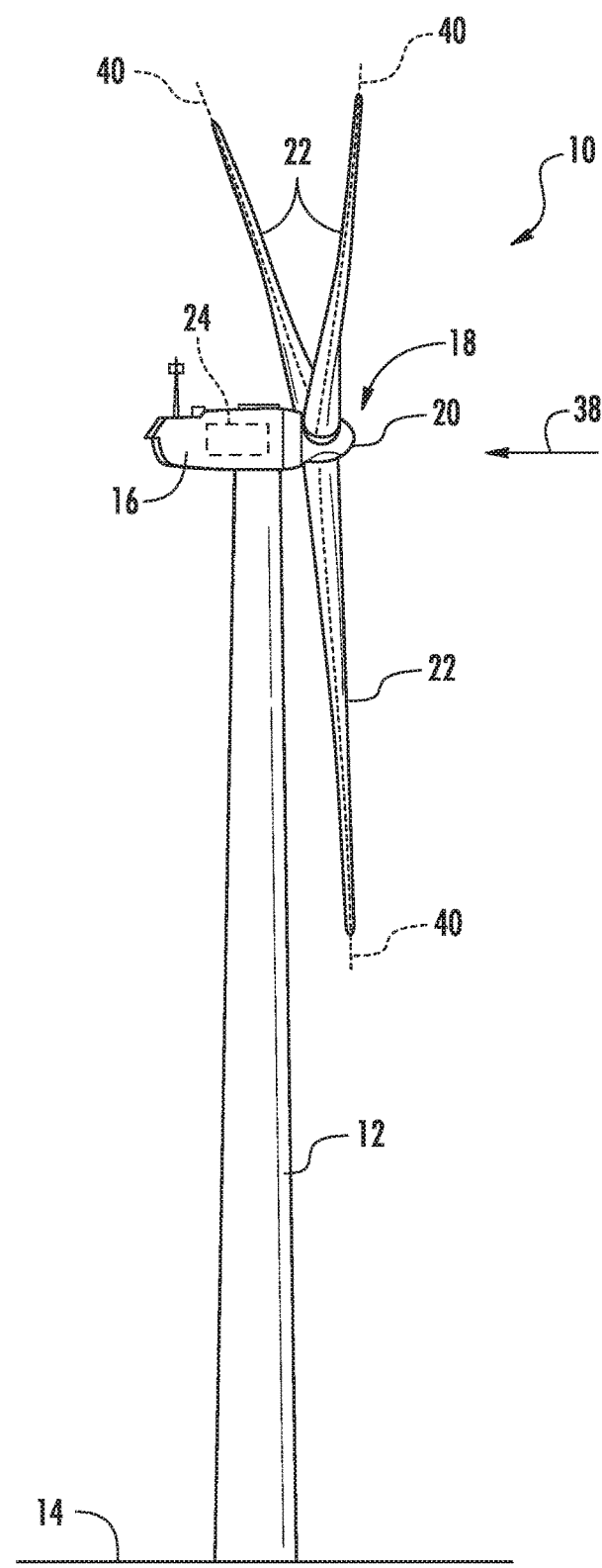
FIG. 1 is a perspective view of an exemplary wind turbine according to one embodiment of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted atop the tower 12, and a rotor 18 rotatably coupled to the nacelle 16. The rotor 18 includes a rotor hub 20 and at least one rotor blade 22 coupled to and extending outward from the hub 20. In the embodiment shown in FIG. 1, for example, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 to convert kinetic energy from the wind into usable rotational, mechanical energy. A generator 24 positioned in the nacelle 16 may generate electrical power from the rotational energy of the rotor 18.

Figure 2:
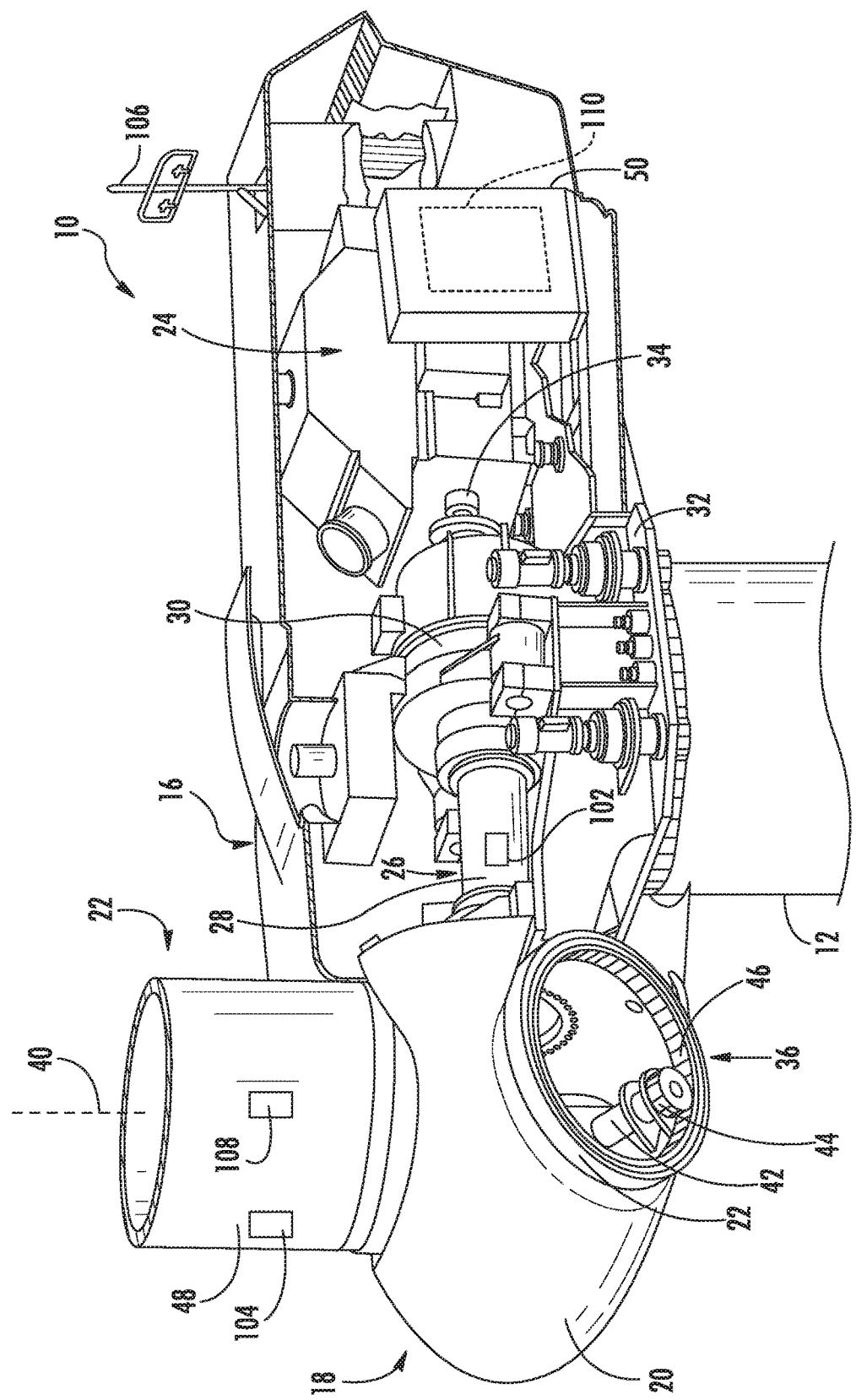
FIG. 2 is a perspective, internal view of a nacelle of the wind turbine according to one embodiment of the present disclosure.

Referring now to FIG. 2, a drivetrain 26 rotatably couples the rotor 18 to the generator 24. As shown, the drivetrain 26 may include a rotor shaft 28 that rotatably couples the hub 20 of the rotor 18 to a gearbox 30. The gearbox 30 may be supported by and coupled to a bedplate 32 within the nacelle 16. The drivetrain 26 may also include a generator shaft 34 that rotatably couples the gearbox 30 to the generator 24. In this respect, rotation of the rotor 18 drives the generator 24. More specifically, the rotor shaft 28 may provide a low speed, high torque input to the gearbox 30 in response to the rotation of the rotor blades 22 and the hub 20. The gearbox 30 may then convert the low speed, high torque input to a high speed, low torque output to drive the generator shaft 34 and, thus, the generator 24. In alternate embodiments, however, the generator 24 may be directly rotatably coupled to the rotor shaft 28 in a direct-drive configuration.

The wind turbine 10 may also include one or more pitch drive mechanisms 36. Although FIG. 2 only illustrates one pitch drive mechanism 36, the wind turbine 10 may include three pitch drive mechanisms 36. In this respect, the wind turbine 10 may include one pitch drive mechanism 36 for each rotor blade 22. In alternate embodiments, however, the wind turbine 10 may include more or fewer pitch drive mechanisms 36.

Each pitch drive mechanism 36 may adjust a pitch angle of the corresponding rotor blade 22 (i.e., the angular orientation of the rotor blade 22 with respect to a direction 38 of the wind). In particular, each rotor blade 22 may be rotatably coupled to the hub 20 by a pitch bearing (not shown). As such, each pitch drive mechanism 36 may rotate one of the rotor blades 22 about a corresponding pitch axis 40 (FIG. 1) relative to the hub 20, thereby adjusting the pitch angle of the rotor blade 22.

FIG. 2 illustrates an exemplary embodiment of one of the pitch drive mechanisms 36. More specifically, the pitch drive mechanism 36 may include an electric motor 42 having a pinion gear 44 coupled thereto. The pinion gear 44 may engage a ring gear 46 formed on or coupled to an inner surface of the corresponding rotor blade 22. During operation of the pitch drive mechanism 36, the electric motor 42 rotates the pinion gear 44, which rotates the rotor blade 22 about the corresponding pitch axis 40. In alternate embodiments, the pitch drive mechanism 36 may include any suitable type of actuator and/or any suitable structure or mechanism for transmitting the movement of the actuator to the rotor blade 22.

Figure 3:
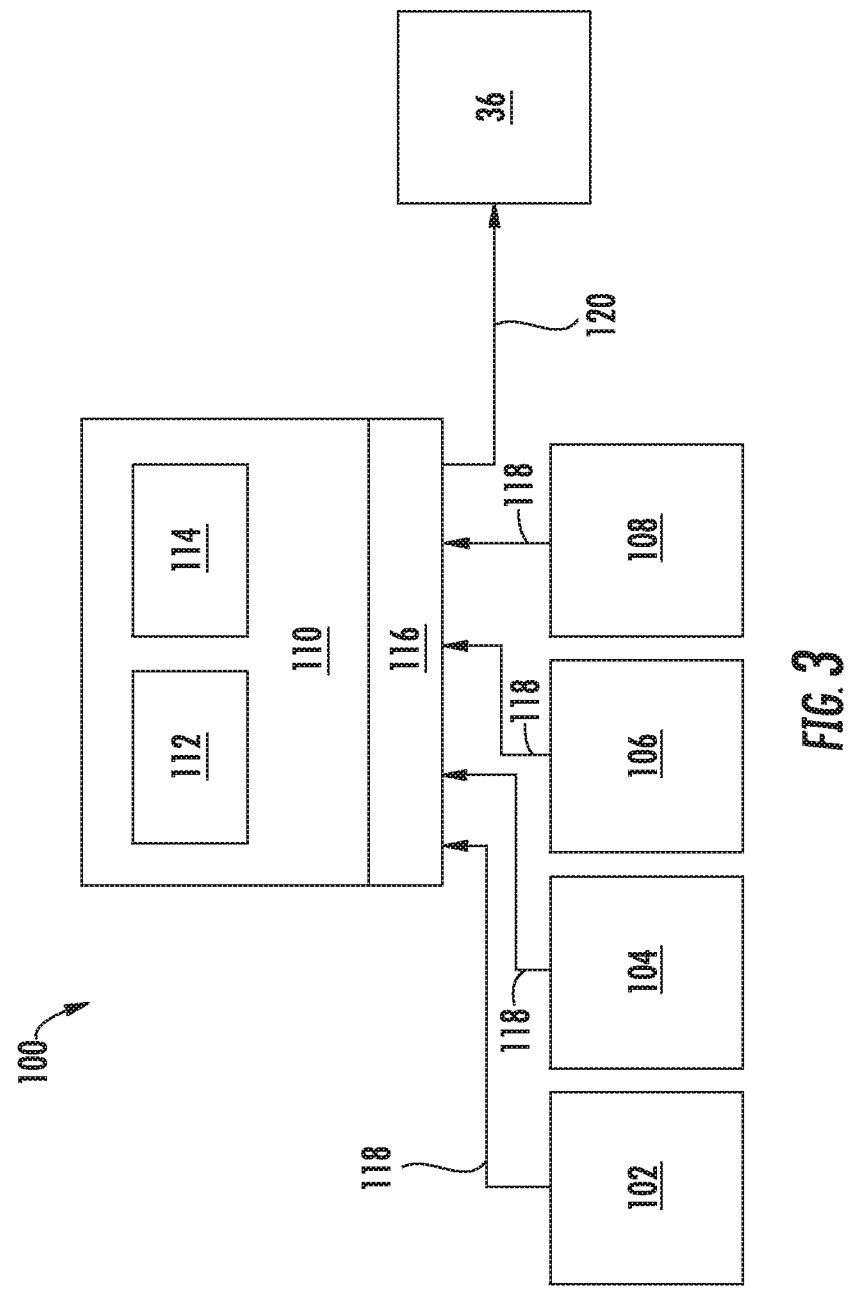
FIG. 3 is a schematic view of a system for controlling a pitch angle of a rotor blade of the wind turbine according to one embodiment of the present disclosure.

FIG. 3 illustrates a system 100 for the loads of the rotor blades 22 of the wind turbine 10. As will be discussed in greater detail below, the system 100 controls the pitch angles of the rotor blades 22 during operation of the wind turbine 10 to mitigate the loads exerted on the rotor blades 22 by the wind.

As shown in FIG. 3, the system 100 may include various sensors. For example, the wind turbine 10 may include a rotor shaft position sensor 102, a pitch angle sensor 104, a wind velocity sensor 106, and a load sensor 108. In alternate embodiments, however, the system 100 may include only some of the sensors 102, 104, 106, 108 or none of the sensors 102, 104, 106, 108. Furthermore, the system 100 may include other sensors (e.g., accelerometers, vibration sensors, etc.) in addition to or lieu of the sensors 102, 104, 106, 108.

The rotor shaft position sensor 102 detects a rotational position of the rotor shaft 28. The rotational position of the rotor shaft 28 may be used to determine the rotational position and/or the rotational velocity of the rotor blades 22. As shown in FIG. 2, the rotor shaft position sensor 102 is operatively coupled to a rotor shaft 28. The rotor shaft position sensor 102 may be a Hall Effect sensor or any other suitable type of sensor for detecting absolute or incremental rotational position.

The pitch angle sensor 104 detects a pitch angle of the corresponding rotor blade 22. In this respect, the pitch angle sensor 104 is operatively coupled to the one of the rotor blades 22 as shown in FIG. 2. Although only one pitch angle sensor 104 is shown in FIGS. 2 and 3, the system 100 may include one pitch angle sensor 104 operatively coupled to each rotor blade 22. The pitch angle sensor 104 may be a Hall Effect sensor or any other suitable type of sensor for detecting absolute or incremental rotational position.

The wind velocity sensor 106 detects a velocity of the wind experienced by the wind turbine 10 and, more particularly, the rotor blades 22. In the embodiment in FIG. 2, the wind velocity sensor 106 is mounted to the exterior of the nacelle 16. As such, the wind velocity sensor 106 may be a suitable anemometer or a wind vane. In alternate embodiments, however, the wind velocity sensor 106 may be a light detection and ranging (LIDAR) sensor or any other suitable type of sensor for detecting wind velocity.

The load sensor 108 detects a load of one of the rotor blade 22, such as a load caused by the wind. In particular embodiments, the load sensor 108 detects a load of a root portion 48 of the rotor blade 22. In this respect, the load sensor 108 may be operatively coupled to the root section 48 of the corresponding rotor blade 22 as shown in FIG. 2. Although only one load sensor 108 is shown in FIGS. 2 and 3, the system 100 may include one load sensor 108 operatively coupled to each rotor blade 22. The load sensor 108 may be a strain gauge, load cell, or any other suitable type of sensor for detecting the load of one of the rotor blades 22.

Referring again to FIG. 3, the system 100 includes a controller 110 communicatively coupled to one or more components of the system 100 and/or the wind turbine 10, such as the sensors 102, 104, 106, 108 and the pitch drive mechanisms 36. For clarity, FIG. 3 shows the controller 110 is communicatively coupled to one pitch angle sensor 104, one load sensor 108, and one pitch drive mechanism 36. Nevertheless, the controller 110 may be communicatively coupled to any number of pitch angle sensors 104, load sensors 108, and pitch drive mechanisms 36. In the embodiment shown in FIG. 2, for example, the controller 110 is disposed within a control cabinet 50 mounted within a portion of the nacelle 16. In alternate embodiments, however, the controller 110 may be disposed at any location on or in the wind turbine 10, at any location on the support surface 14, or any other suitable location.

In general, the controller 110 may correspond to any suitable processor-based device, including one or more computing devices. As shown in FIG. 3, for example, the controller 110 may include one or more processors 112 and one or more associated memory devices 114 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 114 may generally include memory element(s) including a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 114 may store instructions that, when executed by the processor 112, cause the processor 112 to perform functions (e.g., the method described herein).

The controller 110 may also include a communications module 116 to facilitate communications between the controller 110 and the various components of the system 100 and/or the wind turbine 10. For example, the communications module 116 may permit the controller 110 to receive measurement signals 118 from the sensors 102, 104, 106, 108. Furthermore, the communications module 116 may permit the controller 110 to transmit control signals 120 to each pitch drive mechanism 36 for controlling the pitch angle of the rotor blades 22. In this respect, the communications module 116 may be any combination of suitable wired and/or wireless communication interfaces that communicatively couple the sensors 102, 104, 106, 108 and the pitch drive mechanisms 36 to the controller 110.

As mentioned above, the system 100 controls the pitch angles of the rotor blades 22 to reduce the loads exerted thereon by the wind and other atmospheric conditions. For example, the wind velocity experienced by the rotor blades 22 may vary based on the rotational position thereof. In this respect, the loads of the rotor blades 22 may also vary based on the rotational position of the rotor blades 22 relative to the nacelle 16 (FIG. 2). The system 100 may initiate pitch angle adjustments of the rotor blades 22 before the rotor blades 22 reach the rotational positions where high wind velocities are present. As such, the rotor blades 22 are oriented at pitch angles that minimize the loads of the rotor blades 22 when the rotor blades 22 reach a rotational position where high wind velocities are present.

Figure 4:
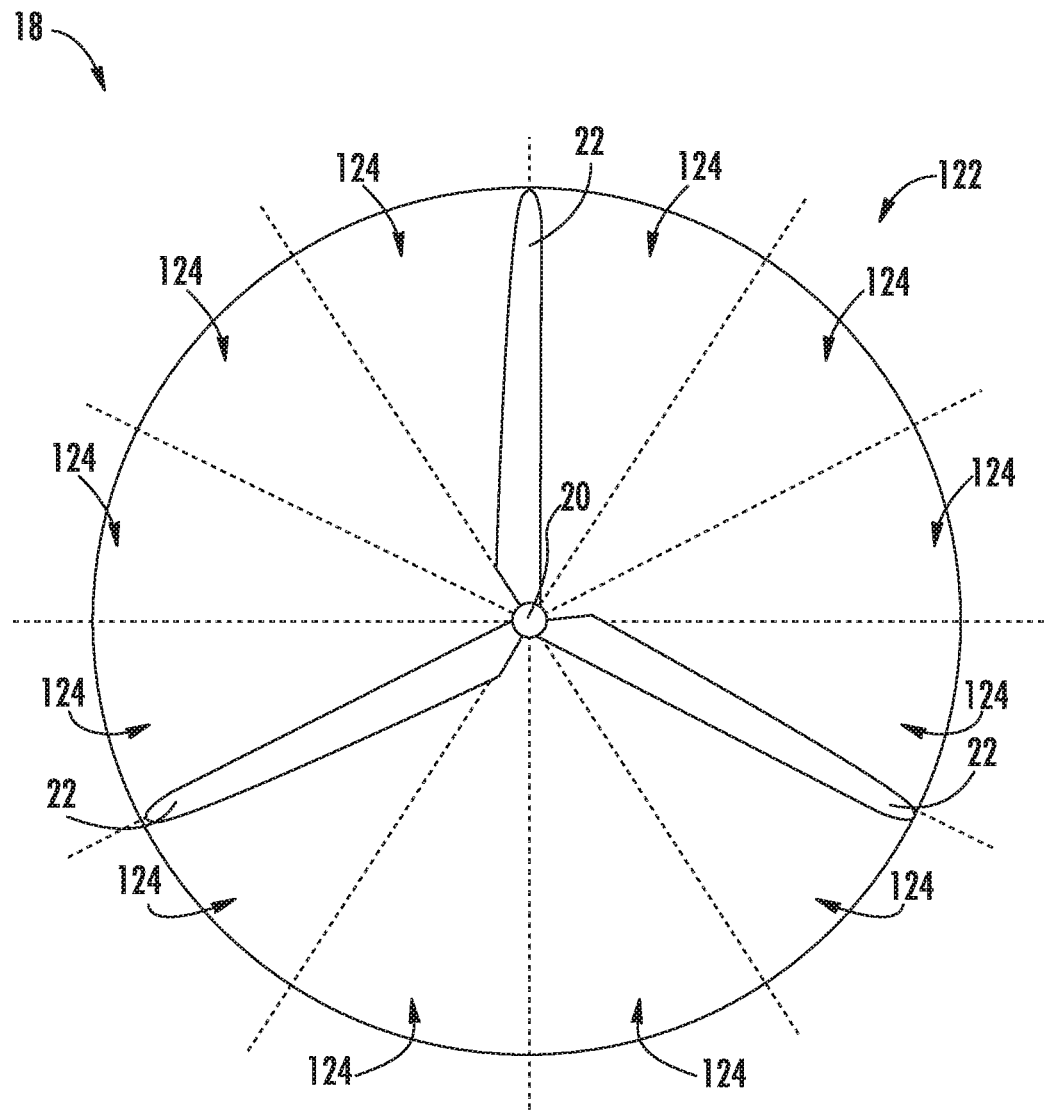
FIG. 4 is a front view of a rotor of the wind turbine in according to one embodiment of the disclosure.

Referring now to FIG. 4, the controller 110 may be configured to define a plurality of rotor plane sectors 124 of a rotor plane 122 defined by the rotor blades 22. More specifically, the rotor plane 122 is the plane in which the rotor blades 22 rotate. As such, the rotor plane 122 is generally extends radially outward from a center of the hub 20. In the embodiment shown in FIG. 4, the controller 110 is configured to define twelve uniformly-sized rotor planes sectors 124. As shown, each rotor plane sector 124 corresponds to a range of rotational positions that the rotor blades 22 may occupy as the rotor 18 rotates relative to the nacelle 16. In alternate embodiments, however, the controller 110 may be configured to divide the rotor plane 122 into more or fewer rotor plane sectors 124 and the rotor plane sectors 124 may be non-uniformly sized.

The controller 110 is configured to monitor a load of a first rotor blade 22. For example, the controller 110 may be configured to monitor a load of the root section 48 of the first rotor blade 22. Although, the controller 110 may also be configured to monitor a load of any portion of the first rotor blade 22. In some embodiments, the controller 110 may be configured to monitor the loads of any of the rotor blades 22, including all of the rotor blades 22.

More specifically, the controller 110 may be configured to determine the load of the first rotor blade 22 based on the measurement signals 118 received from one or more of the sensors 102, 104, 106, 108. For example, the controller 110 may be configured to directly determine the load of the first rotor blade 22 based on the measurement signals 118 received from the load sensor 108. Alternatively, the controller 110 may be configured to determine the load of first rotor blade 22 indirectly based on feedback from one or more other sensors (e.g., the wind velocity sensor 106) that detect parameters (e.g., wind velocity) indirectly related to the rotor blade load. In this respect, the controller 110 may include a look-up table or suitable mathematical formula stored within the memory 114 that correlates the sensor measurements to the rotor blade load.

Once the load of the first rotor blade 22 is determined, the controller 110 may then be configured to compare the load to a first load threshold. The first load threshold may correspond to an undesirably high rotor blade load. In this respect, it may generally be desirable to adjust the corresponding pitch angle of any rotor blade 22 experiencing loads that exceed the first load threshold.

When the load of the first rotor blade 22 exceeds the first load threshold, the controller 110 is configured to designate the rotor plane sector 124 in which the first rotor blade 22 is located as a high load rotor plane sector. As mentioned above, the loads exerted on the rotor blades 22 may be dependent on their rotational position (i.e., the rotor plane sector 124 in which it is located). For example, the rotor blades 22 may experience loads exceeding the first load threshold when located in certain rotor plane sectors 124 and loads below the first load threshold when located in other rotor plane sectors 124. The controller 110 may be configured to determine which rotor plane sector 124 the first rotor blade 22 is positioned in when the loads thereon exceed the first load threshold. In particular, the controller 110 may determine the location of the first rotor blade 22 based on the measurement signals 118 received from the rotor shaft position sensor 102 or another sensor that detects a parameter indicative of the position of the rotor blades 22. In this respect, the controller 110 may include a look-up table or suitable mathematical formula stored within the memory 114 that correlates the sensor measurements to the rotor blade positions. In some embodiments, when the loads of any rotor blade 22 exceed the first load threshold, the controller 110 may be configured to designate the rotor plane sectors 124 in which those rotor blades 22 are located as high load rotor plane sectors.

The system 100 may not adjust the pitch angle of the first rotor blade 22 when the loads thereon first exceed the first load threshold. That is, the first rotor blades 22 endures the load that initially exceeds the first load threshold and triggers designation of one of the rotor plane sectors 124 as a high load rotor plane sector. Only after designation does the system 100 adjust the pitch angles of any rotor blade 22 entering one of the high load rotor plane sectors 124.

The system 100 is then configured to adjust the pitch angle of a second rotor blade 22 toward a first position, such as a feathered position, before the second rotor blade 22 enters the high load rotor plane sector. For example, the system 100 may initiate the pitch angle adjustment of the second rotor blade 22 when positioned a predetermined number of rotor plane sectors 124 apart from the high load rotor plane sector. More specifically, the controller 110 may send control signals 120 to the corresponding pitch drive mechanism 36 when the second rotor blade 22 is positioned the predetermined number of rotor plane sectors 124 apart from the high load rotor plane sector. Upon receipt of the control signals 120, the pitch drive mechanism 36 begins adjusting the pitch angle of the second rotor blade 22 toward the first position. The predetermined number of rotor plane sectors 124 may generally be selected to provide the pitch device mechanism 36 sufficient time to complete the desired pitch angle adjustment before the second rotor blade 22 reaches the high load rotor plane sector. In this respect, the second rotor blade 22 is oriented at the desired pitch angle to mitigate the loads thereon when entering the high load rotor plane sector. In certain embodiments, the predetermined number of rotor plane sectors 124 may be a preset number, such as two rotor plane sectors 124. In alternate embodiments, the predetermined number of rotor plane sectors 124 may be determined dynamically based on the rotational velocity the rotor blades 22. In certain embodiments, such as embodiments where the wind turbine 10 includes only one rotor blade 22, the first and second rotor blades 22 may be the same blade. In further embodiments, the system 100 may be configured to adjust the pitch angle of any rotor blade 22 toward the first position before that rotor blade 22 enters one of the high load rotor plane sectors.

The controller 110 may be configured to determine or select the pitch angle of the second rotor blade 22 when positioned within the high load rotor plane sector based on a magnitude of the load of the first rotor blade 22 exceeding the first load threshold in the high load rotor plane sector 124. For example, the controller 110 may include a look-up table or suitable mathematical formula stored within its memory 114 that determines the pitch angle adjustment. In one embodiment, the pitch angle of the second rotor blade 22 in the high load rotor plane sector 124 may be closer to the feathered position when the load exceeds the first threshold by a larger amount. In alternate embodiments, however, the pitch angle of the second rotor blade 22 when positioned within the high load rotor plane sector may be independent of the magnitude of the load of the first rotor blade 22. As such, the pitch angle of any rotor blade 22 when positioned within the high load rotor plane sector may be based on a magnitude of the load of that rotor blade 22. For example, the pitch angle of the second rotor blade 22 when positioned within the high load rotor plane sector may be based on a magnitude of the load of the second rotor blade 22 when in the high load rotor plane sector 124.

The system 100 may be configured to adjust the pitch angle of the second rotor blade 22 exiting the high load rotor plane sector toward a second position, such as a power position. More specifically, the controller 110 may send control signals 120 to the corresponding pitch drive mechanism 36 when the second rotor blade 22 exits the high load rotor plane sector. Upon receipt of the control signals 120, the pitch drive mechanism 36 adjusts the pitch angle of the second rotor blade 22 to toward the second position. In certain embodiments, the system 10 may not adjust the pitch angle of the second rotor blade 22 exiting the high load rotor plane sector toward a second position when that high load rotor plane sector is less than the predetermined number of rotor plane sectors 124 apart from another high load rotor plane. In further embodiments, the controller 110 may be configured to adjust the pitch angle of any rotor blade 22 exiting any high load rotor plane sector toward the second position.

When the load of the first rotor blade 22 or any other rotor blade 22 falls below a second load threshold while positioned in one of the high load rotor plane sectors, the controller 110 may be configured to remove the designation of high load rotor plane sector from that rotor plane sector 124. After the designation of high load rotor plane sector is removed, the system 100 may not adjust the pitch angle of the second rotor blade 22 to reduce the loads thereon before entering that rotor plane sector 124. In some embodiments, the controller 110 may be configured to remove the designation of high load rotor plane sector from any rotor plane sector 124 when the loads of any rotor blades 22 positioned therein fall below the second load threshold.

In some embodiments, the controller 110 may be configured remove the designation of high load rotor plane sector only after the load of the first rotor blade 22 or any other rotor blade 22 has fallen below the second threshold in that rotor plane sector 124 a predetermined number of times.

More specifically, the controller 110 may be configured to determine a number of times in which the load of the first rotor blade 22 falls below the second load threshold when positioned in the high load rotor plane sector. When the number of times exceeds a threshold, the controller 110 may then be configured to remove the designation of the high load rotor plane sector from that rotor plane sector 124.

The second load threshold may be less than the first load threshold. This may be desirable to account for hysteresis. In alternate embodiments, however, the second load threshold may be same the first load threshold.

Figure 5:
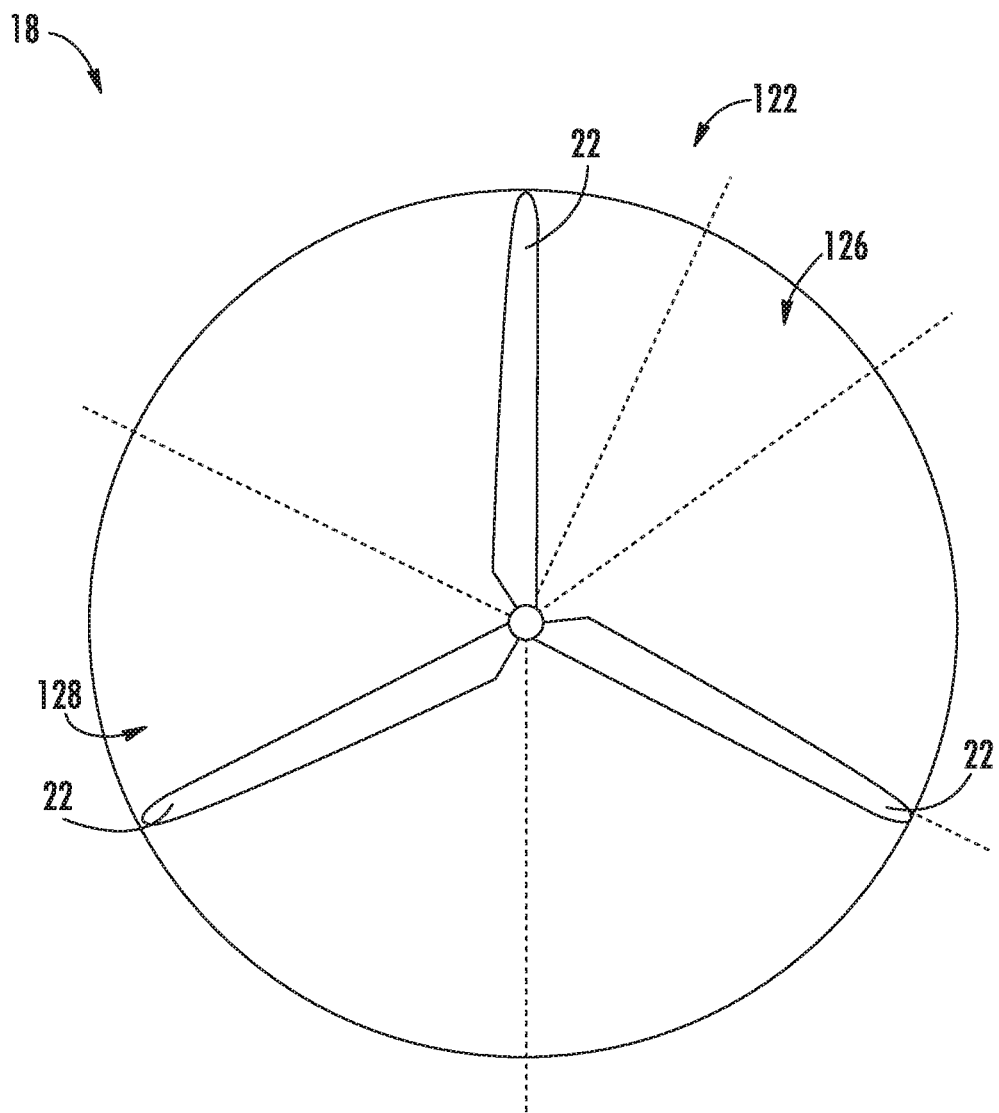
FIG. 5 is a front view of a rotor of the wind turbine in according to another embodiment of the disclosure.

Referring now to FIG. 5, in alternate embodiments, the controller 110 may be configured to define the high load rotor plane sectors (indicated by arrows 126, 128 in FIG. 5) based on where rotor blades 22 exceed the first load threshold. More specifically, the controller 110 may be configured to monitor the load of the first rotor blade 22 and/or any other rotor blade 22 as described above. When the load of the first rotor blade exceeds the first load threshold, the controller 110 may be configured to define a high load rotor plane sector as the portion(s) of a rotor plane 122 where the first rotor blade 22 or any other rotor blade 22 exceeds the first load threshold. In such embodiments, the rotor plane 122 is not divided into predefined rotor plane sectors 124. Instead, the controller 110 designates the portion(s) of the rotor plane 122 where the first rotor blade 22 exceeds the first load threshold as high load rotor plane sector(s). In this respect, the high load rotor plane sectors may have varying sizes during the operation of the wind turbine 10. As shown in FIG. 5, for example, the high load rotor plane sector 128 occupies a larger portion of the rotor plane 122 than the high load rotor plane sector 126. The system 100 may then adjust the pitch angle of the second rotor blade 22 or any other rotor blade 22 toward the first position before the second rotor blade 22 or any other rotor blade 22 enters the high load rotor plane sector as described above.

The primary difference between the system 100 described in the context of FIG. 4 and the system 100 described in the context of FIG. 5 is the manner in which the loads on the rotor blades 22 are tracked. As described above, the system 100 of FIG. 4 designates those particular rotor plane sector(s) 124 with predefined size in which high loads on the rotor blades 22 occur as high load rotor plane sectors. In this respect, the system 100 of FIG. 4 may define multiple consecutive rotor plane sectors 124 as high load rotor plane sectors. Conversely, the system 100 of FIG. 5 defines high load rotor plane sectors where high loads on the rotor blades 22 are present. As such, the system 100 of FIG. 5 would only define one consecutive high load rotor plane sector because this system 100 does not use predefined rotor plane sectors 124. All other aspects of the system 100 of FIG. 4 and the system 100 of FIG. 5 may be the same.

Figure 6:
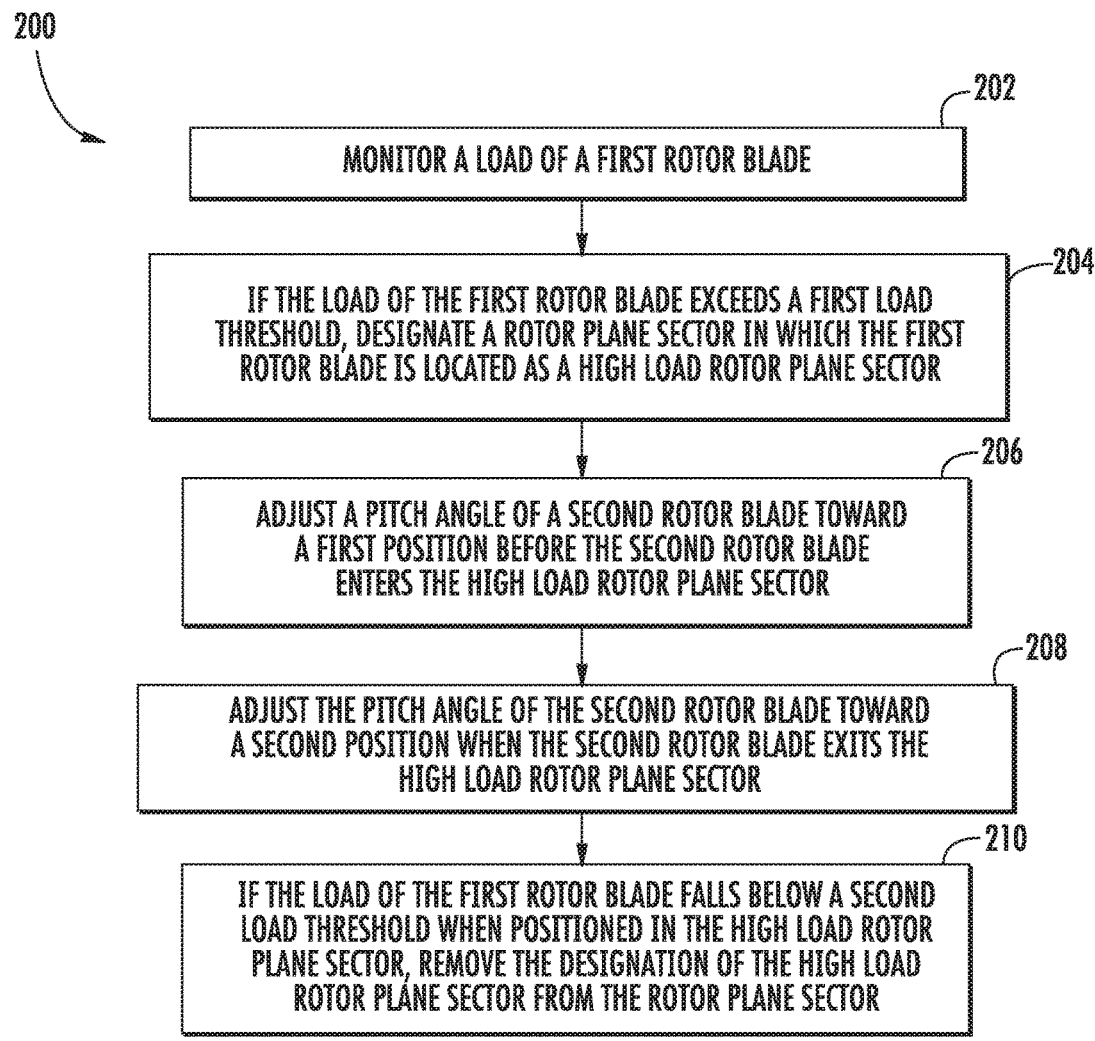
FIG. 6 is a flow chart illustrating a method for controlling the pitch angle of the rotor blade of the wind turbine according to one embodiment of the present disclosure.

FIG. 6 illustrates a method 200 for reducing loads of the rotor blades 22 of the wind turbine 10 in accordance with embodiments of the present disclosure. Although FIG. 6 depicts steps performed in a particular order for purposes of illustration and discussion, the methods discussed herein are not limited to any particular order or arrangement. In this respect, the various steps of the methods disclosed herein can be omitted, rearranged, combined, and/or adapted in various ways without deviating from the scope of the present disclosure.

In step 202, the loads of the first rotor blade 22 are monitored. In some embodiments, the loads of any of the rotor blades 22, including all of the rotor blades 22, may be monitored.

In step 204, when the load of the first rotor blade 22 exceeds the first load threshold, the rotor plane sector 124 in which the first rotor blade 22 is located is designated as a high load rotor plane sector. In some embodiments, when the load of any of the rotor blades 22 exceeds the first load threshold, the rotor plane sector 124 in which those rotor blades 22 are located are designated as high load rotor plane sectors.

In step 206, the pitch angle of the second rotor blade 22 is adjusted toward the first position before entering the high load rotor plane sector. For example, the pitch angle adjustment may be initiated when the second rotor blade is positioned the predetermined number of rotor plane sectors apart from the high load rotor plane sector. The pitch angle of the second rotor blade when positioned in the high load rotor plane sector may be determined based on a magnitude of the load of the first rotor blade exceeding the first load threshold. In some embodiments, the pitch angles of any or all of the rotor blades 22 are adjusted toward the first position before entering any high load rotor plane sector. In further embodiments, the pitch angle of any rotor blade 22 when positioned within the high load rotor plane sector may be based on a magnitude of the load of that rotor blade 22 while in the high load rotor plane sector.

In step 208, the pitch angle of the second rotor blade 22 is adjusted toward the second position when exiting the high load rotor plane sector. In some embodiments, the pitch angle of any rotor blade 22 exiting any high load rotor plane sector is adjusted toward the second position.

In step 210, the designation of high load rotor plane sector may be removed from the rotor plane sector 124 when the first rotor blade 22 or any other rotor blade 22 is positioned in the high load rotor blade sector and the load thereon falls below the second load threshold. In some embodiments, a number of times in which the load of the first rotor blade falls below the second load threshold when positioned in the high load rotor plane sector may be determined. When the number of times exceeds a threshold, the designation of the high load rotor plane sector may be removed from the rotor plane sector 124. In further embodiments, the designation of high load rotor plane sector may be removed from any rotor plane sector 124 when the loads of any rotor blades 22 positioned therein fall below the second load threshold.

Figure 7:
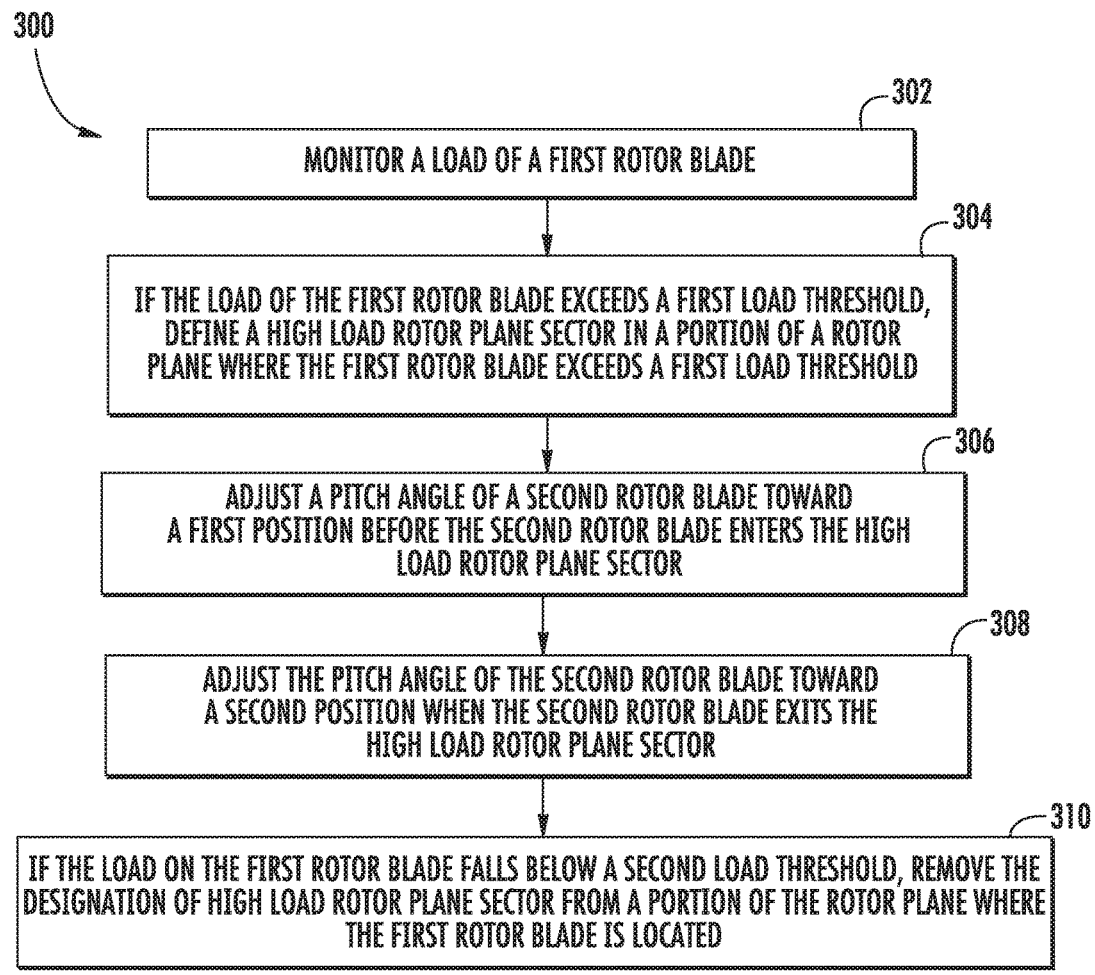
FIG. 7 is a flow chart illustrating a method for controlling the pitch angle of the rotor blade of the wind turbine according to another embodiment of the present disclosure.

FIG. 7 illustrates a method 300 for reducing loads of the rotor blades 22 of the wind turbine 10 in accordance with embodiments of the present disclosure. Although FIG. 7 depicts steps performed in a particular order for purposes of illustration and discussion, the methods discussed herein are not limited to any particular order or arrangement. In this respect, the various steps of the methods disclosed herein can be omitted, rearranged, combined, and/or adapted in various ways without deviating from the scope of the present disclosure.

In step 302, the loads of the first rotor blade 22 are monitored. In some embodiments, the loads of any of the rotor blades 22, including all of the rotor blades 22, may be monitored.

In step 304, when the load of the first rotor blade 22 exceeds the first load threshold, a high load rotor plane sector is defined in a portion of a rotor plane 122 where the first rotor blade 22 exceeds a first load threshold. In some embodiments, when the load of any of the rotor blades 22 exceeds the first load threshold, the portion(s) of the rotor plane 122 where those rotor blade(s) 22 are located are defined as high load rotor plane sector(s).

In step 306, the pitch angle of the second rotor blade 22 is adjusted toward the first position before entering the high load rotor plane sector. For example, the pitch angle adjustment may be initiated when the second rotor blade is positioned the predetermined number of rotor plane sectors apart from the high load rotor plane sector. The pitch angle of the second rotor blade when positioned in the high load rotor plane sector may be determined based on a magnitude of the load of the first rotor blade exceeding the first load threshold. In some embodiments, the pitch angles of any or all of the rotor blades 22 are adjusted toward the first position before entering any high load rotor plane sector. In further embodiments, the pitch angle of any rotor blade 22 when positioned within the high load rotor plane sector may be based on a magnitude of the load of that rotor blade 22 while in the high load rotor plane sector In step 308, the pitch angle of the second rotor blade 22 is adjusted toward the second position when exiting the high load rotor plane sector. Step 308 may be the same as step 208 described above.

In step 310, the designation of high load rotor plane sector may be removed from a portion of the rotor plane 122 when the first rotor blade 22 or any other rotor blade 22 is located in that position and the load thereon falls below the second load threshold. More specifically, when the loads on the rotor blades 22 fall below the second load threshold for only a portion of the high load rotor plane sector, the designation of high load rotor plane sector is removed from only those portions of the high load rotor plane sector where the loads on the rotor blades 22 fall below the second load threshold. As such, the high load rotor plane sector may become smaller or different high load rotor plane sectors when the loads on the rotor blades 22 fall below the second load threshold at various positions in the high load rotor plane sector. Accordingly, the high load rotor plane sector is not removed until the loads on the rotor blades 22 fall below the second threshold for the entirety of the high load rotor plane sector. In this respect, step 310 is different than step 210. In particular, step 210 removes the designation of high load rotor plane sector when the load of the rotor blades 22 falls below the second threshold at any position in the high load rotor plane sector. Conversely, the step 310 removes the designation of high load rotor plane sector when the load of the rotor blades 22 falls below the second threshold at all positions in the high load rotor plane sector.

As discussed in greater detail above, the system 100 and methods 200, 300 initiate pitch angle adjustments of the rotor blades 22 before the rotor blades 22 reach rotational positions where high loads may occur. In this respect, the rotor blades 22 are oriented at pitch angle that reduce the loads of the rotor blades when reaching the rotational positions where high loads may occur. As such, and unlike with conventional systems and methods, the system 100 and the methods 200, 300 do not saturate the pitch drive mechanisms 36 and produce relatively less wear on the wind turbine 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for reducing loads of one or more rotor blades of a wind turbine, the method comprising:
   monitoring a load of a first rotor blade;
   if the load of the first rotor blade exceeds a first load threshold, designating a rotor plane sector in which the first rotor blade is located as a high load rotor plane sector;
   adjusting, via a pitch drive mechanism, a pitch angle of a second rotor blade toward a first position before the second rotor blade enters the high load rotor plane sector;
   determining a number of times in which the load of the first rotor blade falls below a second load threshold when positioned in the high load rotor plane sector; and,
   if the number of times exceeds a threshold, removing the designation of the high load rotor plane sector from the rotor plane sector.

2. The method of claim 1, further comprising initiating, via the pitch drive mechanism, the adjusting step when the second rotor blade is positioned a predetermined number of rotor plane sectors apart from the high load rotor plane sector.

3. The method of claim 2, wherein the predetermined number of rotor plane sectors is associated with a rotational velocity of the second rotor blade.

4. The method of claim 1, further comprising defining a plurality of uniformly-sized rotor blade sectors of a rotor plane defined by the one or more rotor blades, the rotor plane sector being within the plurality of rotor plane sectors.

5. The method of claim 1, further comprising adjusting, via the pitch drive mechanism, the pitch angle of the second rotor blade toward a second position when the second rotor blade exits the high load rotor plane sector.

6. The method of claim 1, wherein the second load threshold is less than the first load threshold.

7. The method of claim 1, wherein monitoring the load of the first rotor blade further comprises monitoring a load of a root section of the first rotor blade.

8. The method of claim 1, further comprising selecting the pitch angle of the second rotor blade based on a magnitude of the load of the first rotor blade exceeding the first load threshold in the high load rotor plane sector.

9. A system for reducing loads of one or more rotor blades of a wind turbine, the system comprising:
   a pitch drive mechanism for adjusting a pitch angle of the one or more of the rotor blades; and
   a controller communicatively coupled to the pitch drive mechanism, the controller being configured to perform one or more operations, the one or more operations comprising:
   monitoring a load of a first rotor blade;
   if the load of the first rotor blade exceeds a first load threshold, designating the rotor plane sector in which the first rotor blade is located as a high load rotor plane sector;
   controlling the pitch drive mechanism to adjust the pitch angle of the second rotor blade toward a first position before the second rotor blade enters the high load rotor plane sector;
   determining a number of times in which the load of the first rotor blade falls below a second load threshold when positioned in the high load rotor plane sector; and,
   if the number of times exceeds a threshold, removing the designation of the high load rotor plane sector from the rotor plane sector.

10. The system of claim 9, wherein the one or more operations further comprise controlling the pitch drive mechanism to initiate the adjustment step when the second rotor blade is positioned a predetermined number of rotor plane sectors apart from the high load rotor plane sector.

11. The system of claim 10, wherein the predetermined number of rotor plane sectors is associated with a rotational velocity of the second rotor blade.

12. The system of claim 9, wherein a rotation of the one or more rotor blades defines a rotor plane, the rotor plane defining a plurality of uniformly-sized rotor blade sectors.

13. The system of claim 9, wherein the one or more operations further comprise controlling the pitch angle adjustment mechanism to adjust the pitch angle of the second rotor blade toward a second position when the second rotor blade exits the high load rotor plane sector.

14. The system of claim 9, wherein the second load threshold is less than the first load threshold.

15. The system of claim 9, wherein the one or more operations further comprise monitoring a load of a root section of the first rotor blade.

16. The system of claim 9, wherein the one or more operations further comprise determining the pitch angle of the second rotor blade based on a magnitude of the load of the first rotor blade exceeding the first load threshold in the high load rotor plane sector.

17. A method for reducing loads of one or more rotor blades of a wind turbine, the method comprising:
  monitoring a load of a first rotor blade;
  if the load of the first rotor blade exceeds a first load threshold, defining a high load rotor plane sector as a portion of a rotor plane where the first rotor blade exceeds a first load threshold; and,
  adjusting, via a pitch drive mechanism, a pitch angle of a second rotor blade toward a first position before the second rotor blade enters the high load rotor plane sector;
  determining a number of times in which the load of the first rotor blade falls below a second load threshold when positioned in the high load rotor plane sector; and,
  if the number of times exceeds a threshold, removing the designation of the high load rotor plane sector from the rotor plane sector.

* * * * *